(12) United States Patent
Sugimoto et al.

(10) Patent No.: US 9,016,169 B2
(45) Date of Patent: Apr. 28, 2015

(54) BICYCLE SPROCKET

(75) Inventors: Akinobu Sugimoto, Osaka (JP); Eigo Kuroiwa, Osaka (JP)

(73) Assignee: Shimano Inc., Osaka (JP)

( * ) Notice: Subject to any disclaimer, the term of this patent is extended or adjusted under 35 U.S.C. 154(b) by 82 days.

(21) Appl. No.: 13/539,817

(22) Filed: Jul. 2, 2012

(65) Prior Publication Data

US 2013/0087013 A1 Apr. 11, 2013

(30) Foreign Application Priority Data

Oct. 5, 2011 (TW) .............................. 100136080 A

(51) Int. Cl.
*B62M 3/00* (2006.01)
*B62M 9/10* (2006.01)

(52) U.S. Cl.
CPC ..................................... *B62M 9/105* (2013.01)

(58) Field of Classification Search
USPC .............. 74/594.1, 594.2; 474/144, 152, 158, 474/160
See application file for complete search history.

(56) References Cited

U.S. PATENT DOCUMENTS

| | | | | |
|---|---|---|---|---|
| 560,929 A | * | 5/1896 | Rau ................................ | 474/152 |
| 612,453 A | * | 10/1898 | Bird et al. ....................... | 192/43 |
| 3,416,385 A | * | 12/1968 | Schenk ........................... | 474/152 |
| 4,869,709 A | * | 9/1989 | Nagano .......................... | 474/152 |
| 7,686,721 B2 | * | 3/2010 | Tabe et al. ...................... | 474/152 |
| 2005/0014590 A1 | * | 1/2005 | Wen ................................ | 474/152 |
| 2005/0233850 A1 | | 10/2005 | Andel | |
| 2007/0129193 A1 | * | 6/2007 | Nonoshita et al. ............. | 474/160 |
| 2008/0312016 A1 | | 12/2008 | Chiang | |

FOREIGN PATENT DOCUMENTS

| | | |
|---|---|---|
| DE | 20218755 U1 | 4/2003 |
| DE | 69631437 T2 | 12/2004 |
| DE | 102006022343 A1 | 11/2007 |
| DE | 202010002653 U1 | 7/2010 |
| EP | 1721821 A2 | 11/2006 |
| TW | M365897 U | 10/2009 |

* cited by examiner

*Primary Examiner* — Vicky Johnson

(74) *Attorney, Agent, or Firm* — Global IP Counselors

(57) ABSTRACT

A bicycle sprocket is provided that includes an external peripheral edge part and an internal peripheral edge part. The external peripheral edge part has a plurality of metal sprocket teeth. The internal peripheral edge part is positioned radially inward of the external peripheral edge part. The internal peripheral edge part is integrally formed as a one-piece unit with the external peripheral edge part. The internal peripheral edge part has at least one recess that extends radially outward from an inner edge of the internal peripheral edge part toward the external peripheral edge part.

11 Claims, 7 Drawing Sheets

BICYCLE SPROCKET

CROSS-REFERENCE TO RELATED APPLICATIONS

This application claims priority under 35 U.S.C. §119 to Taiwanese Patent Application No. 100136080, filed Oct. 5, 2011. The entire disclosure of Taiwanese Patent Application No. 100136080 is hereby incorporated herein by reference.

BACKGROUND

1. Field of the Invention

This invention generally relates to a sprocket. More specifically, the present invention relates to a bicycle sprocket.

2. Background Information

A bicycle sprocket is used to transmit rotation of a crank to a rear wheel through a chain. The sprocket is fixed to a right crank attached to a crank axle. A conventionally known bicycle sprocket has a sprocket main body on which sprocket teeth are provided, a first outer shell member arranged on an outward side of the sprocket main body, and a second outer shell member arranged on an inward side of the sprocket main body (see, e.g., Taiwanese Patent Publication Number M365897).

SUMMARY

In the conventional bicycle sprocket, the sprocket comprises three pieces having hollow portions such that the bicycle sprocket can be made lightweight as compared to a solid sprocket. However, there is a demand to make the bicycle sprocket even lighter in weight. One object presented by this present disclosure is to further reduce the weight of a bicycle sprocket.

In view of the state of the known technology, a bicycle sprocket is provided that basically comprises an external peripheral edge part and an internal peripheral edge part. The external peripheral edge part has a plurality of metal sprocket teeth. The internal peripheral edge part is positioned radially inward of the external peripheral edge part. The internal peripheral edge part is integrally formed as a one-piece unit with the external peripheral edge part. The internal peripheral edge part has at least one recess that extends radially outward from an inner edge of the internal peripheral edge part toward the external peripheral edge part. In this bicycle sprocket, the at least one recess is provided in the internal peripheral edge part and extends radially outward from the internal peripheral edge part. As a result, the bicycle sprocket can be made even lighter in weight.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
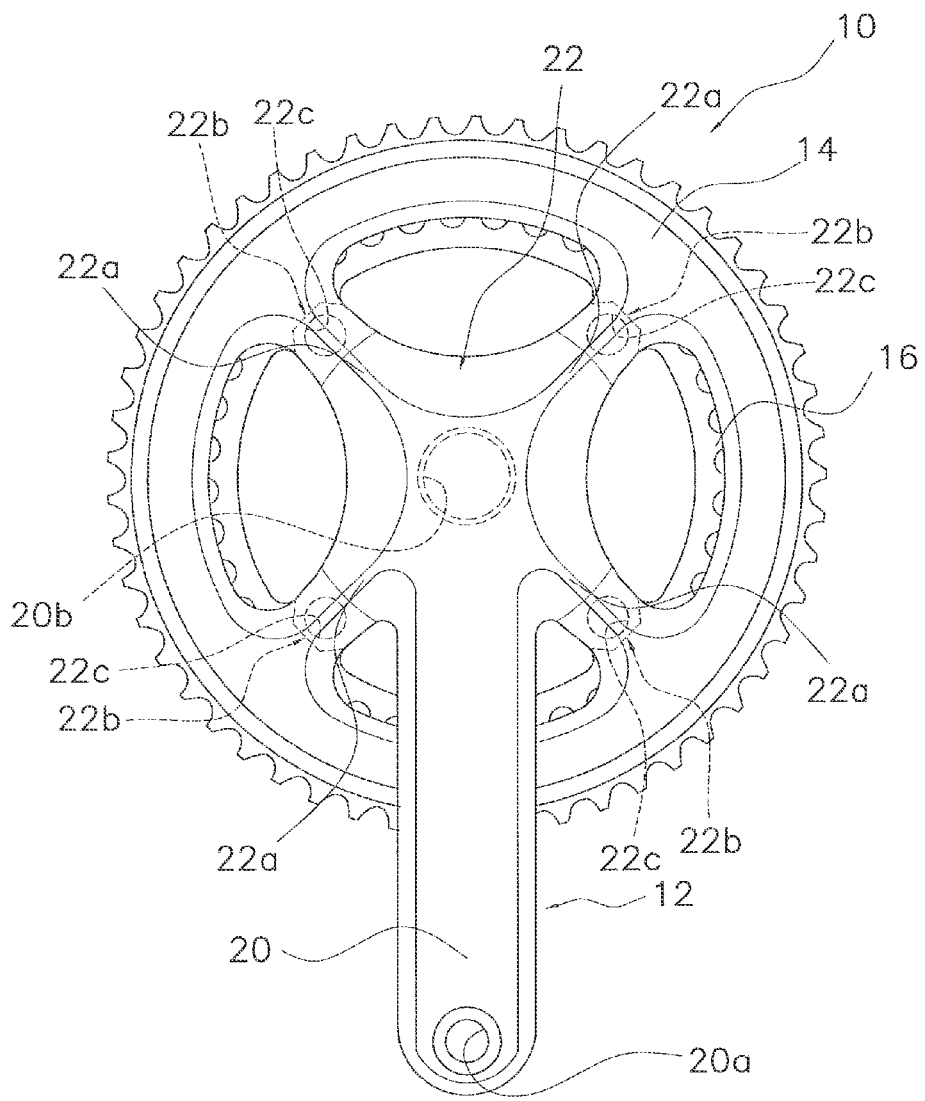
FIG. 1 is an outside elevational view of a right bicycle crankset that includes a sprocket in accordance with a first embodiment.

Referring initially to FIG. 1, a right crank assembly 10 is illustrated for a bicycle in accordance with a first embodiment. The right crank assembly 10 comprises a crank main body 12, a first bicycle sprocket 14, and a second sprocket 16. The right crank assembly 10 is also sometimes called a right crankset. The first bicycle sprocket will hereinafter be called simply the first sprocket 14. The crank main body 12 has a crank arm 20 that extends along a radial direction, a sprocket mounting part 22 that is formed as a one-piece integral unit with the crank arm 20. The crank arm 20 has a pedal mounting part 20a at a tip end and a crank axle mounting part 20b at a base end thereof. The sprocket mounting part 22 has a plurality of mounting arms 22a (e.g., four mounting arms) and a sprocket fastening part 22b. The mounting arms 22a extend radially from a center of the crank axle mounting part 20b. The sprocket fastening part 22b is provided on a tip end portion of each of the mounting arms 22a. A through hole 22c is formed in each of the sprocket fastening parts 22b for passing a threaded fastening member (e.g., a bolt member).

Figure 2:
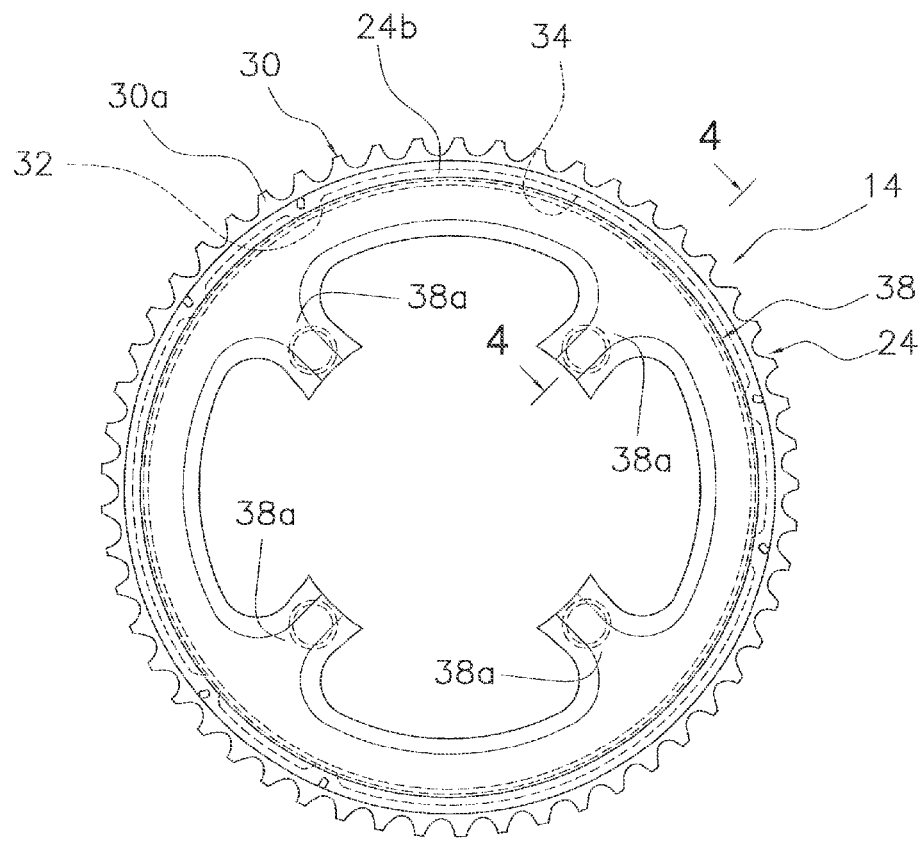
FIG. 2 is an outside elevational view of the bicycle sprocket illustrated in FIG. 1 according to the first embodiment.
Figure 3:
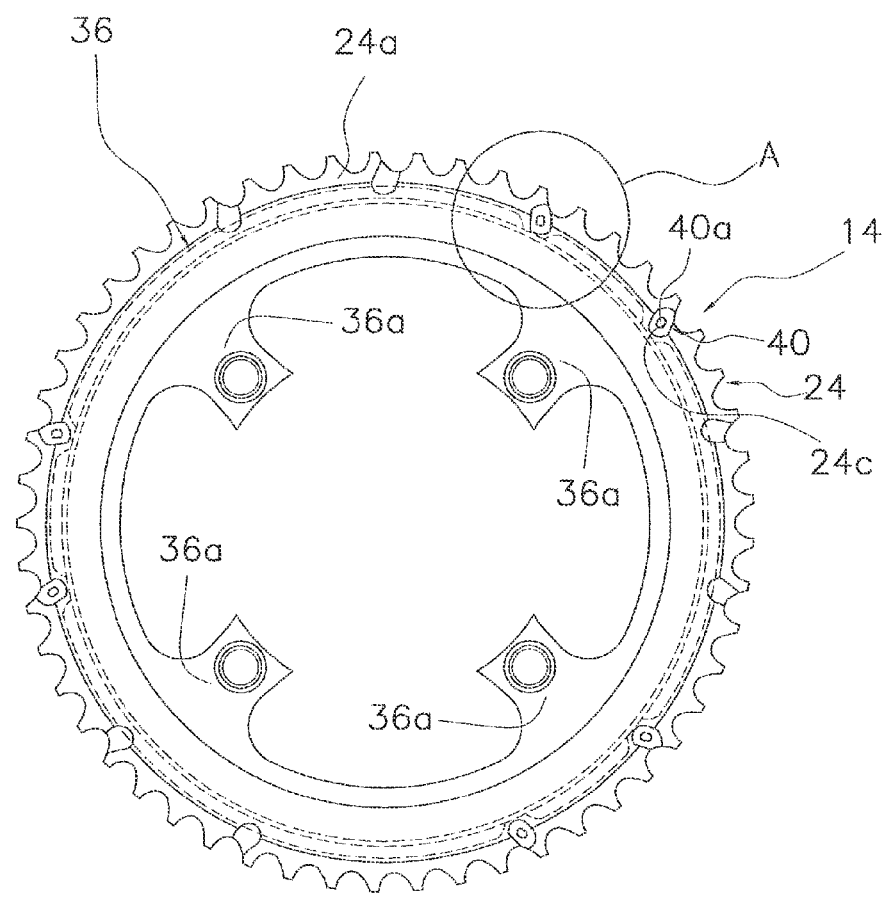
FIG. 3 is an inside elevational view of the bicycle sprocket illustrated in FIGS. 1 and 2.
Figure 4:
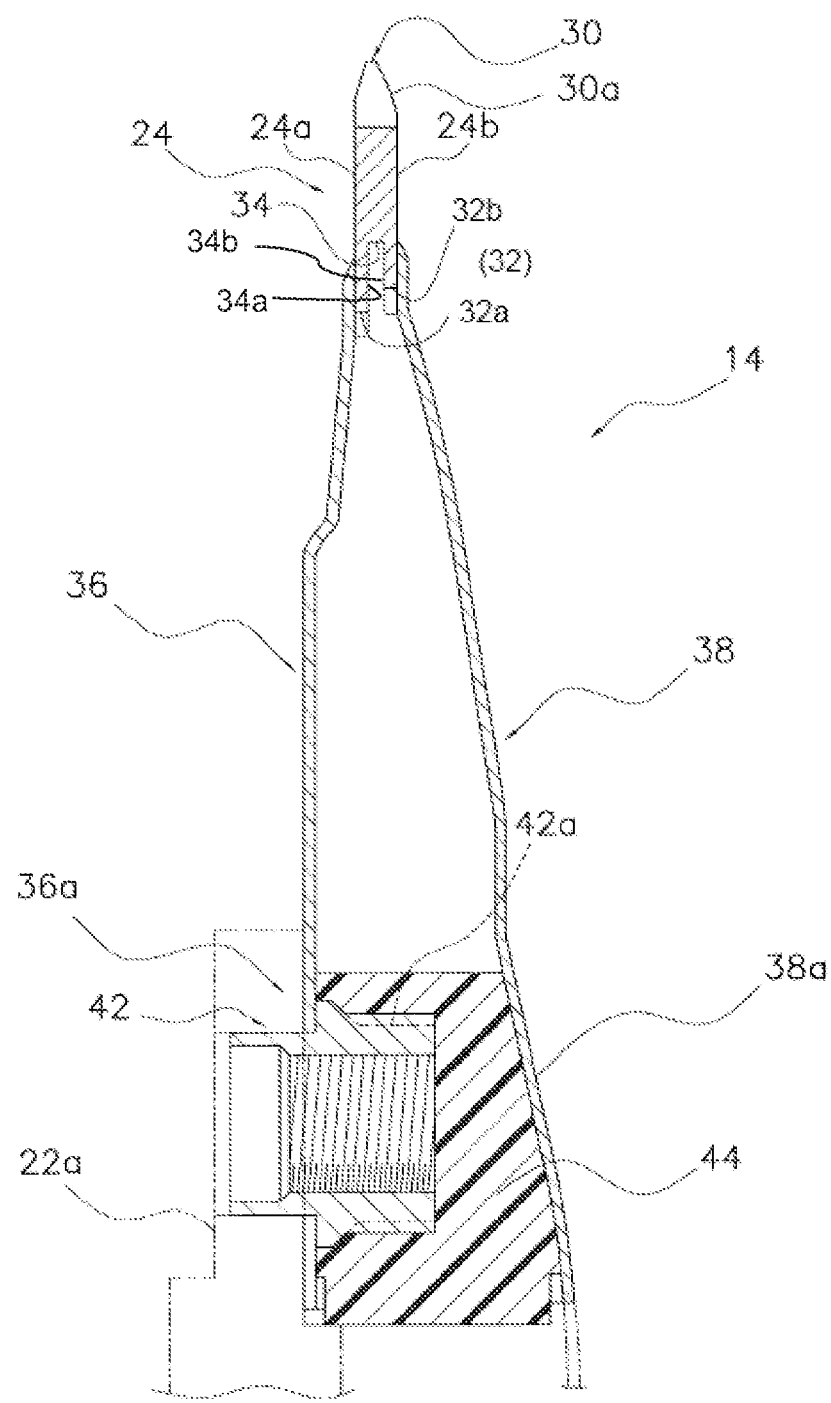
FIG. 4 is a cross sectional view of a portion of the bicycle sprocket illustrated in FIGS. 1 to 3 taken along the section line 4-4 of FIG. 2.

As shown in FIGS. 2, 3 and 4, the first sprocket 14 has a larger number of teeth than the second sprocket 16. The first sprocket 14 includes a sprocket main body 24 having a first surface 24a and a second surface 24b. As shown in FIGS. 3 and 4, the first surface 24a is arranged on the inward facing side when the first sprocket 14 is attached to the crank main body 12. As shown in FIGS. 2 and 4, the second surface 24b is arranged on the outward facing side. The sprocket main body 24 includes an external peripheral edge part 30, an internal peripheral edge part 32 and a plurality of recesses 34 (e.g., six recesses). The external peripheral edge part 30 is formed with a plurality of metal sprocket teeth 30a. The internal peripheral edge part 32 is formed as a one-piece integral unit with the external peripheral edge part 30. The internal peripheral edge part 32 is positioned radially inward of the external peripheral edge part 30. The recesses 34 are provided in the internal peripheral edge part 32. The recesses 34 extend from the internal peripheral edge part 32 in a radially outward direction relative to a rotational center of the first sprocket 14. Each of the recesses 34 is partially defined by a first axially facing surface 34a and a second axially facing surface 34b. In a preferable embodiment, each of the recesses 34 extends a greater distance in a circumferential direction along the internal peripheral edge part 32 than in a radial outward direction from the inner edge of the internal peripheral edge part 32. Preferably, the recesses 34 extend along a majority of the internal peripheral edge part 32. In the first illustrated embodiment, the recesses 34 extend along at least ninety percent of the internal peripheral edge part 32.

Alternatively, the recesses 34 can extend continuously around the edge of the internal peripheral edge part 32 as needed and/or desired. Also, in the first illustrated embodiment, the internal peripheral edge part 32 has an axially inner portion 32a disposed on an axially inner side of the recess and an axially outer portion 32b disposed on an axially outer side of the recess along the axial direction of the bicycle sprocket. The axially inner portion 32a and the axially outer portion 32b are radially offset from each other.

The first sprocket 14 also includes a first outer shell member 36 shown in FIGS. 3 and 4 and a second outer shell member 38 shown in FIGS. 2 and 4. The first outer shell member 36 is joined to the first surface 24a of the sprocket main body 24 near the internal peripheral edge part 32, and the second outer shell member 38 is joined to the second surface 24b of the sprocket main body 24 near the internal peripheral edge part 32.

The first surface 24a of the sprocket main body 24 is provided with a plurality of spike pin mounting parts 24c (e.g., six) for each mounting one of a plurality of spike pins 40. The spike pins 40 are arranged on the first surface 24a of the sprocket main body 24 with spaces in-between along a circumferential direction. The spike pins 40 are used to aid in shifting a chain during a gear change operation from the second sprocket 16 to the first sprocket 14. In the illustrated embodiments, the spike pin mounting parts 24c are through holes passing from the first surface 24a to the second surface 24b. However, the spike pin mounting parts 24c can have other configurations such as a deformable part that is inserted into a hole of a spike pin and then deformed to secure the spike pin to the sprocket main body 24. Each of the spike pins 40 has a mounting shaft 40a that passes through the spike pin mounting part 24c. The mounting shaft 40a is fastened to the first surface 24a by crimping the mounting shaft 40a.

Figure 5:
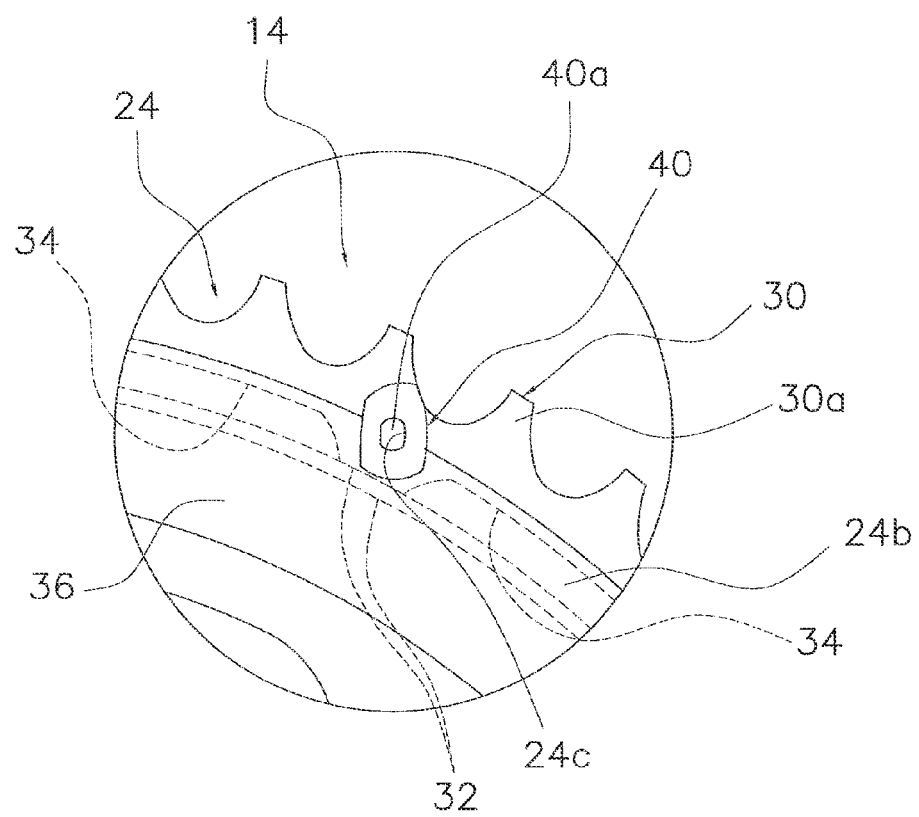
FIG. 5 is an enlarged inside elevational view of a portion A of the bicycle sprocket illustrated in FIG. 3.

The recesses 34 are circular arc-shaped such that the recesses 34 extend in a circumferential direction along the internal peripheral edge part 32. As shown in the enlarged view of FIG. 5, the recesses 34 are formed everyplace except where the spike pin mounting parts 24c are provided. Alternatively, if the spike pin mounting parts 24c are eliminated, then the recesses 34 can extend continuously around the edge of the internal peripheral edge part 32. For example, the spike pins 40 can be integrally formed with the first surface 24a of the sprocket main body 24. Also as shown in FIG. 4, along each of the recesses 34, the portion of the internal peripheral edge part 32, which is located adjacent the first surface 24a, extends farther inward in a radial direction than the portion of the internal peripheral edge part 32, which is located adjacent the second surface 24b.

The first outer shell member 36 is made of, for example, an aluminum alloy or another lightweight metal. The first outer shell member 36 is directly or indirectly joined to the second outer shell member 38 using an adhesive or other joining means. The first outer shell member 36 has a plurality of first crank mounting parts 36a (e.g., four). The crank mounting parts 36a are attached to the mounting arms 22a of the crank main body 12. The first crank mounting parts 36a are each covered by a second crank mounting part 38a, which is explained later. Consequently, the first crank mounting parts 36a are not exposed on the side of the second surface 24b. The first crank mounting parts 36a extend inward in radial directions. The first crank mounting parts 36a constitutes a first crank mounting portion of the first outer shell member 36.

As shown in FIG. 4, a nut member 42 and a reinforcing member 44 are fixed to each of the first crank mounting parts 36a of the first outer shell member 36. The reinforcing member 44 is arranged such that it surrounds the nut member 42. The nut members 42 are made of, for example, an aluminum alloy, and bolt members (not shown) are threaded into the nut members 42 to fasten the first sprocket 14 to the mounting arms 22a. The nut members 42 have splines 42a to prevent the nut members 42 from rotating at the portions where they are fastened to the reinforcing members 44. The reinforcing members 44 are made of, for example, a polyamide resin, a polyacetal resin, or another synthetic resin material. The reinforcing members 44 serve to reinforce the portions where the first sprocket attaches to the crank main body 12. The reinforcing members 44 are, for example, insert molded with the nut members 42. The part resulting from the insert molding is joined to the first outer shell member 36 and the second outer shell member 38 with, for example, an adhesive.

The second outer shell member 38 is made of, for example, an aluminum alloy or another lightweight metal. The second outer shell member 38 is arranged on the outward side when the crank is installed on a bicycle. Thus, the second outer shell member 38 plays an important role regarding the aesthetic design of the right crank assembly 10. The second outer shell member 38 has a plurality of second crank mounting parts 38a (e.g., four crank mounting parts). Each of the second crank mounting parts 38a has curved surface that smoothly adjoins an outward surface of the mounting arms 22a. The second crank mounting parts 38a serve to cover the portions where the sprocket attaches to the crank. Thus, the second outer shell member 38 can improve the aesthetic design of the right crank assembly 10 10 because the second outer shell member 38 hides the portions where the sprockets 14 and 16 are attached, and the second outer shell member 38 adjoins smoothly with the crank main body 12. The second crank mounting parts 38a constitutes a second crank mounting portion of the second outer shell member 38.

In the first embodiment, the first outer shell member 36 and the second outer shell member 38 serve to ensure the strength of the first sprocket 14.

The second sprocket 16 is made of, for example, an aluminum alloy. The second sprocket 16 is fastened to the mounting arms 22a together with the first sprocket 14 using the nut members 42. The first sprocket 14 is attached to an outward surface of the mounting arms 22a (right-hand surface in FIG. 4), and the second sprocket 16 is attached to an inward surface of the mounting arms 22a (left-hand surface in FIG. 4).

Thus, the first sprocket 14 can be made lighter in weight because of the recesses 34 that extend radially outward from the internal peripheral edge part 32. Also, since the recesses 34 extend in the circumferential direction, the volume occupied by the recesses 34 can be increased and the weight can be reduced even further. Since the first sprocket 14 comprises three pieces, i.e., the sprocket main body 24 having the sprocket teeth 30a, the first outer shell member 36, and the second outer shell member 38, the interior of the first sprocket 14 can be made hollow and the weight can be reduced even further. Meanwhile, since the first outer shell member 36 and the second outer shell member 38 are made of metal, sufficient strength can be ensured while providing a high-quality appearance.

Figure 6:
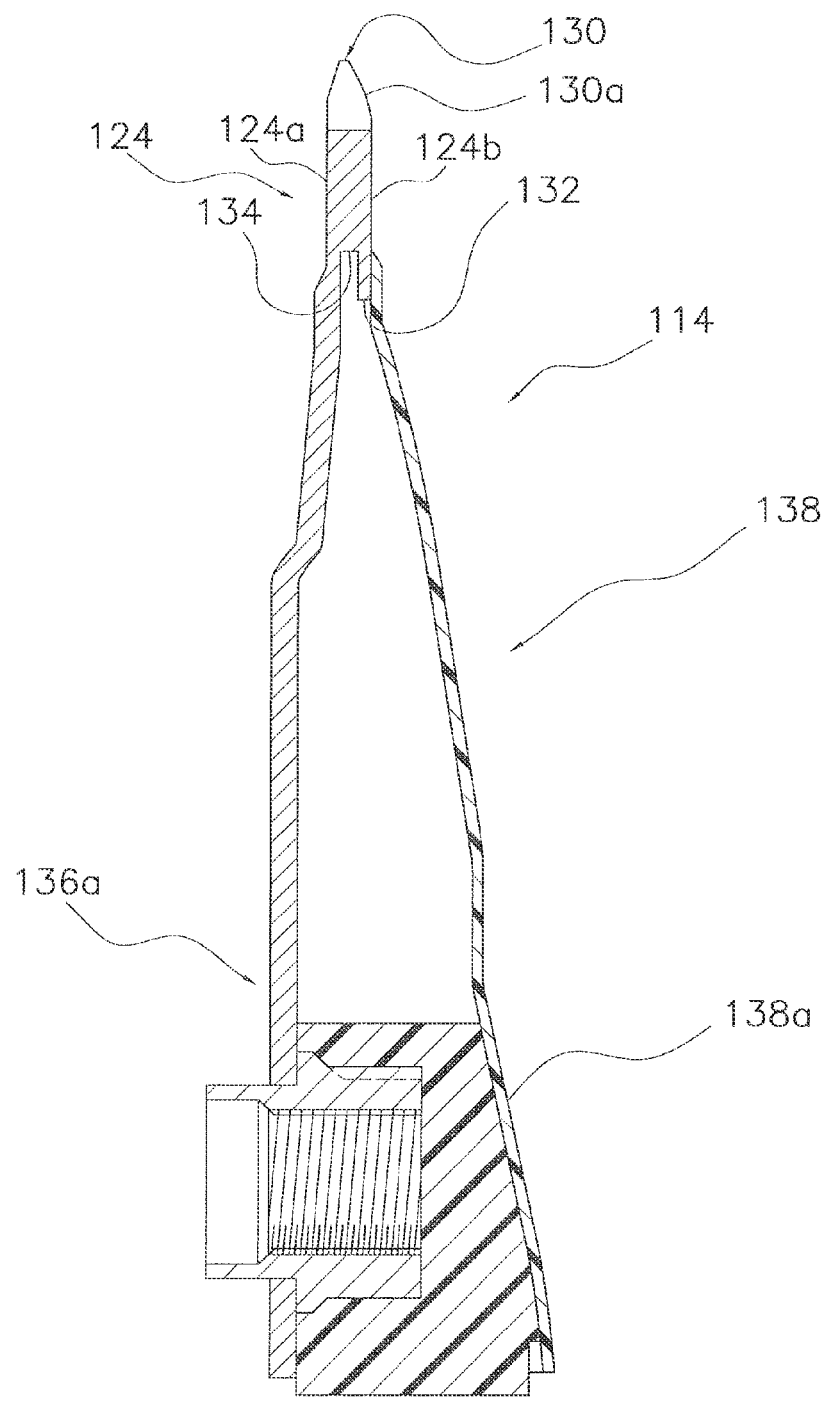
FIG. 6 is a cross sectional view, corresponding to FIG. 4, of a portion of a bicycle sprocket showing a second embodiment.

FIG. 6 shows a second embodiment in which the first sprocket 114 comprises an outer shell member 138 and a sprocket main body 124. The sprocket main body 124 has a first surface 124a and a second surface 124b. The sprocket main body 124 includes an external peripheral edge part 130, an internal peripheral edge part 132 and a plurality of recesses 134 (e.g., six recesses). The external peripheral edge part 130 forms a plurality of metal sprocket teeth 130a. The internal peripheral edge part 132 is formed as a one-piece integral unit with the external peripheral edge part 130. The internal peripheral edge part 132 is positioned radially inward of the external peripheral edge part 130. The recesses 134 are provided in the internal peripheral edge part 132 and extend from the internal peripheral edge part 132 in a radially outward direction. The sprocket main body 124 also has a plurality of first crank mounting parts 136a (only one shown). The first crank mounting parts 136a are formed integrally with the internal peripheral edge part 132 located on the side having the first surface 124a of the sprocket main body 124. The nut members 42 and the reinforcing members 44 are fixed to the first crank mounting parts 136a similarly to the first embodiment. The sprocket main body 124 serves to ensure the strength of the first sprocket 114.

The outer shell member 138 has a similar shape to the second outer shell member 38 of the first embodiment, but it is made of resin instead of metal. The outer shell member 138 is made of, for example, a resin reinforced with carbon fibers. The outer shell member 138 has a plurality of second crank mounting parts 138a (only one shown). The second crank mounting parts 138a are configured the same as in the first embodiment. In the second embodiment, the outer shell member 138 serves chiefly to provide the aesthetic design of the first sprocket 114.

Thus, in the second embodiment, the first sprocket 114 has a two-piece structure comprising the sprocket main body 124 and the outer shell member 138. Consequently, the interior of the first sprocket 114 can be made hollow the weight of the first sprocket 114 can be reduced.

Figure 7:
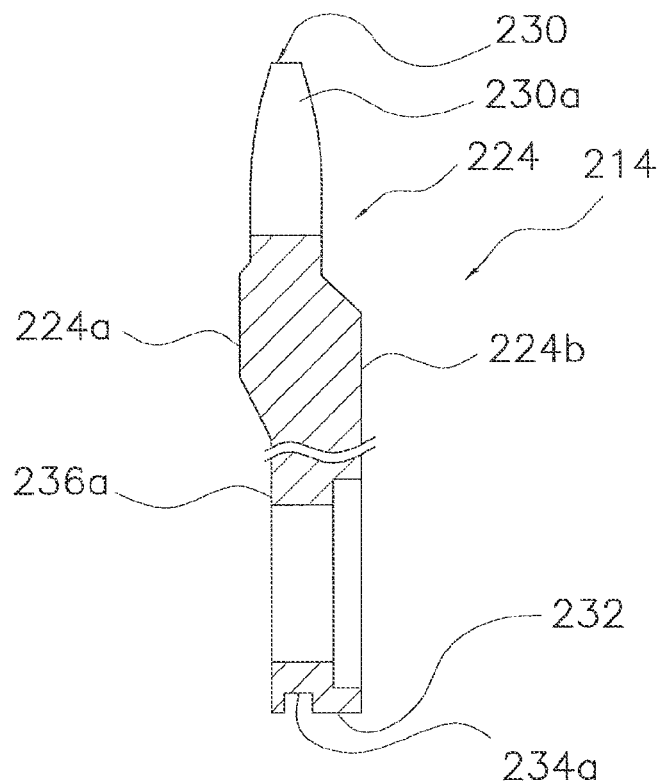
FIG. 7 is a cross sectional view, corresponding to FIG. 4, of a portion of a bicycle sprocket showing a third embodiment.
Figure 8:
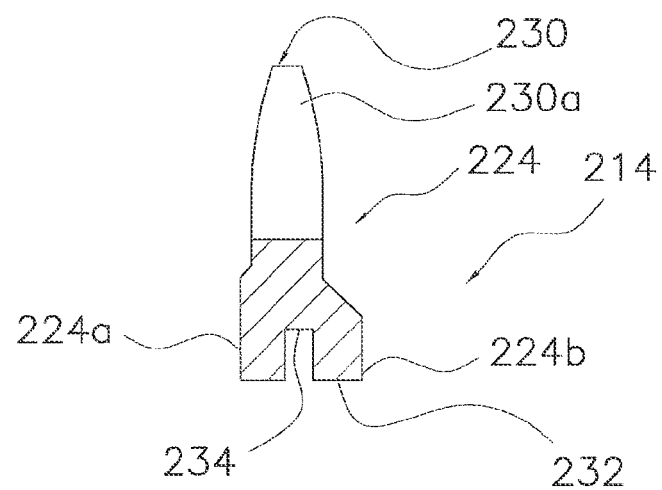
FIG. 8 is a cross sectional view of another portion of the bicycle sprocket according to the third embodiment which corresponds to an area between two adjacent crank mounting parts.

FIGS. 7 and 8 show a third embodiment in which the first sprocket 214 has a sprocket main body 224, and does not have an outer shell member. The sprocket main body 224 has a first surface 224a and a second surface 224b. The sprocket main body 224 also has an external peripheral edge part 230 an internal peripheral edge part 232. The internal peripheral edge part has a plurality of first recesses 234 and a plurality of second recesses 234a. The sprocket main body 224 has a plurality of crank mounting parts 236a (e.g., four crank mounting parts—only one shown). The crank mounting parts are formed integrally on a radially inward side of the sprocket main body 224. In the third embodiment, the second recesses 234a adjoin the first recesses 234. The second recesses 234a are formed in portions of the internal peripheral edge part 232 corresponding to the crank mounting parts 236a in order to reduce weight. The second recesses 234a are shallower than the first recesses 234. With the third embodiment, a bicycle sprocket having a one-piece structure can be made lighter in weight.

Although in the first embodiment the first outer shell member 36 and the second outer shell member 38 are made of metal, it is acceptable for either or both of the shell members to be made of resin so long as sufficient strength can be ensured.

Although in the first embodiment the recesses 34 are formed everyplace except where the spike pin mounting parts 24c are provided, it is acceptable to form a recess 34 that spans around the entire circumference of the internal peripheral edge part 32.

In the second embodiment, although the outer shell member is made of resin, it is acceptable for outer shell member to be made of metal.

Although in the previously explained embodiments a recess is not provided in the smaller-diameter second sprocket 16, it is acceptable to provide a recess in the second sprocket to reduce the weight of the second sprocket as well.

Although in the previously explained embodiments the invention is explained based on a sprocket provided on a right crank, the invention can be applied to any kind of sprocket so long as it is a bicycle sprocket. For example, the invention can also be applied to a sprocket provided on a left crank used in a tandem bicycle. The present invention can also be applied to a sprocket installed on a rear hub.

In the third embodiment, although the second recesses 234a are provided, it is acceptable not to provide the second recesses 234a.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
   an external peripheral edge part having a plurality of metal sprocket teeth; and
   an internal peripheral edge part positioned radially inward of the external peripheral edge part and integrally formed as a one-piece unit with the external peripheral edge part, the internal peripheral edge part having at least one recess that extends radially outward from an inner edge of the internal peripheral edge part toward the external peripheral edge part and opens in a radially inward direction toward a rotational center of the bicycle sprocket, the at least one recess extending in a circumferential direction of the bicycle sprocket along a majority of the internal peripheral edge part, the at least one recess having a first axially facing surface and a second axially facing surface, the first and second axially facing surfaces facing toward each other along an axial direction of the bicycle sprocket.

2. The bicycle sprocket as recited in claim 1, further comprising
   a first outer shell member coupled to the internal peripheral edge part at a first surface of the bicycle sprocket, and including a first crank mounting part positioned radially inward of the internal peripheral edge part; and
   a second outer shell member coupled to the internal peripheral edge part at a second surface of the bicycle sprocket on an opposite axial side from the first surface, and including a second crank mounting part positioned radially inward of the internal peripheral edge part.

3. The bicycle sprocket as recited in claim 2, wherein
   the first outer shell member and the second outer shell member are made of metal.

4. The bicycle sprocket as recited in claim 2, wherein
   the first outer shell member is made of metal and the second outer shell member is made of a fiber reinforced resin.

5. A bicycle sprocket as recited in claim 1, further comprising an outer shell member including a first crank mounting part is attached to a first surface of the internal peripheral edge part and a second crank mounting part is attached to a second surface of the internal peripheral edge part on an opposite axial side from the first surface.

6. The bicycle sprocket as recited in claim 5, wherein the outer shell member is made of metal.

7. The bicycle sprocket as recited in claim 5, wherein the outer shell member is a fiber reinforced resin.

8. The bicycle sprocket as recited in claim 1, further comprising
a crank mounting part integrally formed as a one-piece unit with the internal peripheral edge part.

9. The bicycle sprocket as recited in claim 1, further comprising
at least one spike pin mounting part provided near the internal peripheral edge part, the at least one recess being located along an entire edge of the internal peripheral edge part except at the at least one spike pin mounting part.

10. The bicycle sprocket as recited in claim 1, wherein comprising:
an external peripheral edge part having a plurality of metal sprocket teeth; and
an internal peripheral edge part positioned radially inward of the external peripheral edge part and integrally formed as a one-piece unit with the external peripheral edge part,
the internal peripheral edge part having at least one recess that extends radially, outward from an inner edge of the internal peripheral edge part toward the external peripheral edge part, the at least one recess having a first axially facing surface and a second axially facing surface, the first and second axially facing surfaces facing toward each other along an axial direction of the bicycle sprocket,
the internal peripheral edge part having an axially inner portion disposed on an axially inner side of the recess and an axially outer portion disposed on an axially outer side of the recess along the axial direction of the bicycle sprocket, the axially inner portion and the axially outer portion being radially offset from each other.

11. The bicycle sprocket as recited in claim 10, wherein
the axially inner portion of the internal peripheral edge part is disposed farther inward in a radial direction of the bicycle sprocket than the axially outer portion.

* * * * *